United States Patent
Christensen

(10) Patent No.: US 7,178,427 B2
(45) Date of Patent: Feb. 20, 2007

(54) MOTOR DRIVEN HARMONIC DRIVE ACTUATOR HAVING AN INTERPOSED OUTPUT MECHANISM

(75) Inventor: Donald J. Christensen, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 204 days.

(21) Appl. No.: 10/928,690

(22) Filed: Aug. 26, 2004

(65) Prior Publication Data
US 2006/0046889 A1  Mar. 2, 2006

(51) Int. Cl.
*F16H 33/00* (2006.01)

(52) U.S. Cl. .................... 74/640; 74/424.7

(58) Field of Classification Search .......... 74/640, 74/425, 89.23, 424.7
See application file for complete search history.

(56) References Cited

U.S. PATENT DOCUMENTS

| | | | | |
|---|---|---|---|---|
| 1,060,933 | A * | 5/1913 | Myers | 74/424.7 |
| 3,239,699 | A * | 3/1966 | Ferrary | 310/83 |
| 3,565,006 | A * | 2/1971 | Stewart | 101/248 |
| 3,996,816 | A | 12/1976 | Brighton | |
| 4,184,293 | A * | 1/1980 | Bennett, Jr. | 451/406 |
| 4,363,270 | A * | 12/1982 | Ury et al. | 101/180 |
| 4,373,688 | A | 2/1983 | Topliffe | |
| 4,449,442 | A | 5/1984 | Ebbing et al. | |
| 4,479,403 | A | 10/1984 | Marschner et al. | |
| 4,784,015 | A | 11/1988 | Schumacher | |
| 5,593,109 | A | 1/1997 | Williams | |
| 5,626,055 | A * | 5/1997 | Fukui | 74/116 |
| 5,642,645 | A | 7/1997 | Foley et al. | |
| 5,816,117 | A * | 10/1998 | Berry et al. | 74/640 |
| 5,937,710 | A | 8/1999 | Gould et al. | |
| 5,950,502 | A | 9/1999 | Genovese | |
| 6,026,711 | A | 2/2000 | Tortora et al. | |
| 6,273,211 | B1 * | 8/2001 | Engels et al. | 180/446 |
| 6,454,532 | B1 | 9/2002 | Gmirya | |
| 6,543,716 | B1 | 4/2003 | Miller et al. | |
| 6,549,158 | B1 | 4/2003 | Hanson | |
| 6,561,074 | B1 | 5/2003 | Engel et al. | |
| 6,563,450 | B1 | 5/2003 | Wallace | |
| 6,568,628 | B1 | 5/2003 | Curtin et al. | |
| 6,575,400 | B1 | 6/2003 | Hopkins et al. | |
| 6,603,421 | B1 | 8/2003 | Schiff et al. | |
| 6,630,902 | B1 | 10/2003 | Fenton et al. | |
| 6,646,242 | B2 | 11/2003 | Berry et al. | |
| 2004/0055404 | A1* | 3/2004 | Mills et al. | 74/337.5 |
| 2005/0252316 | A1* | 11/2005 | Biester | 74/25 |

* cited by examiner

*Primary Examiner*—Roger Pang
*Assistant Examiner*—Justin K. Holmes
(74) *Attorney, Agent, or Firm*—Ingrassia Fisher & Lorenz

(57) ABSTRACT

A relatively small, lightweight electromechanical actuator includes a motor assembly, a harmonic drive, and an interposed gear assembly that functions as an output mechanism. The motor assembly, harmonic drive, and gear assembly are coupled together in an in-line configuration, which reduces the overall size envelope relative to know actuators, and the relative weight and complexity of the gear assembly.

21 Claims, 5 Drawing Sheets

MOTOR DRIVEN HARMONIC DRIVE ACTUATOR HAVING AN INTERPOSED OUTPUT MECHANISM

TECHNICAL FIELD

The present invention relates to actuators and, more particularly, to a motor driven harmonic drive actuator that has a relatively small space envelope.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. No matter the specific end-use, actuators are many times classified based on the power source that is used to effect actuation. For example, actuators are many times classified as hydraulic-, pneumatic-, or electrically-operated (or electromechanical) actuators.

Electromechanical actuators typically include an actuation element, such as a gear assembly or screw, which is driven by an electric motor. In many instances, it is desirable to physically implement an electromechanical actuator that has a relatively small size and low weight. In the past, these goals have been met by using a relatively small electric motor that rotates at a relatively high rotational speed, and then including some type of gear reduction to increase the output torque of the actuator.

Although the above-described approach generally works well, it does exhibit certain drawbacks. For example, the gear reduction that may be needed to achieve the desired torque output may cause the size and/or weight of the actuator to be higher than desired. Moreover, in some instances, the output of the actuator may need to be supplied at an angle relative to the axis of rotation of the motor, which may result in relatively complex and/or large and/or heavy gears being used.

Hence, there is a need for an electromechanical actuator that includes a small, high speed motor with sufficient gear reduction that has a relatively small space envelope and/or relatively smaller weight as compared to known electromechanical actuator configurations, and/or an actuator assembly that can be configured with an output disposed at an angle relative to the motor axis of rotation without the need for relatively large, complex gearing. The present invention addresses one or more of these needs.

BRIEF SUMMARY

The present invention provides a relatively small, lightweight electromechanical actuator. In one embodiment, and by way of example only, an actuator assembly includes a motor assembly, a harmonic drive, and a gear assembly. The motor assembly includes a motor that is configured to supply a first torque to a motor shaft. The harmonic drive is coupled to receive the first torque from the motor shaft and is operable, in response thereto, to supply a second torque. The gear assembly is rotationally coupled to the motor assembly and at least partially surrounds at least a portion of the motor shaft. The gear assembly is further coupled to receive the second torque from the harmonic drive and is operable, in response thereto, to supply a drive force.

In another exemplary embodiment, an actuator assembly includes a motor housing, a motor, a motor shaft, a harmonic drive, and a gear assembly. The motor is disposed within the housing and is operable to rotate. The motor shaft is coupled to the motor and is configured to rotate therewith. The harmonic drive unit has an input member and an output member. The input member is coupled to the motor shaft and is configured to rotate therewith, and the output member is configured to rotate in response to rotation of the input member. The gear assembly is rotationally mounted on the motor housing and is coupled to the harmonic drive output member.

In yet another exemplary embodiment, an actuator assembly includes a motor housing, a motor, a harmonic drive, an input gear, and an output gear. The motor is mounted at least partially within the motor housing, has a motor shaft, and is configured to supply a first torque to the motor shaft. The harmonic drive is coupled to receive the first torque from the motor shaft and is operable, in response thereto, to supply a second torque. The input gear has at least a first end and a second end and at least partially surrounds at least a portion of the motor shaft. The input gear first end is coupled to receive the second torque from the harmonic drive and is operable, in response thereto, to rotate. The input gear second end is rotationally mounted on the motor housing. The output gear is coupled to the input gear and is configured, upon rotation of the input gear, to supply a drive force.

Other independent features and advantages of the preferred actuator assembly will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background of the invention or the following detailed description of the invention.

Figure 1:
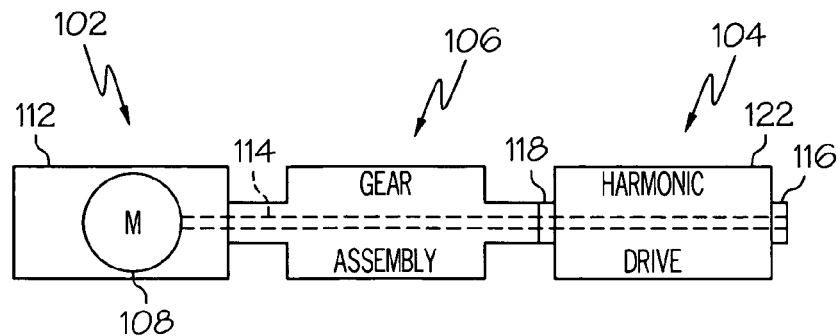
FIG. 1 is a functional block diagram of an exemplary electromechanical actuator of the present invention.

Turning now to the description and with reference first to FIG. 1, a functional block diagram of an exemplary actuator assembly is shown. The actuator assembly 100 includes a motor assembly 102, a harmonic drive 104, and a gear assembly 106. The motor assembly 102 includes a motor 108, which is preferably enclosed within a motor housing 112, and motor shaft 114. The motor 108 is preferably implemented an electric motor, and may be any one of numerous types of AC or DC motors now known or developed in the future including, for example, an AC induction motor or a brushed DC motor. In a preferred embodiment, however, the motor 108 is implemented as a brushless DC motor. Although the motor 108 is preferably implemented as an electric motor, it will nonetheless be appreciated that the motor 108 could be implemented, if so desired, as a pneumatic or hydraulic motor.

No matter how the motor 108 is specifically implemented, it is configured to rotate and thereby supply a torque to the motor shaft 114. The motor shaft 114 extends from the motor housing 112, and into and through the harmonic drive 104. The motor shaft 114 is coupled to the harmonic drive 104 via an input member 116. In response to the torque supplied from the motor shaft 114, the harmonic drive supplies a torque via an output member 118 at a significantly reduced rotational speed from that of the motor shaft 114. To implement this rotational speed reduction, the harmonic drive 104 includes a plurality of interconnected components, all disposed within a housing 122. For completeness, an exemplary embodiment of these internal components will now be briefly described.

Figure 2:
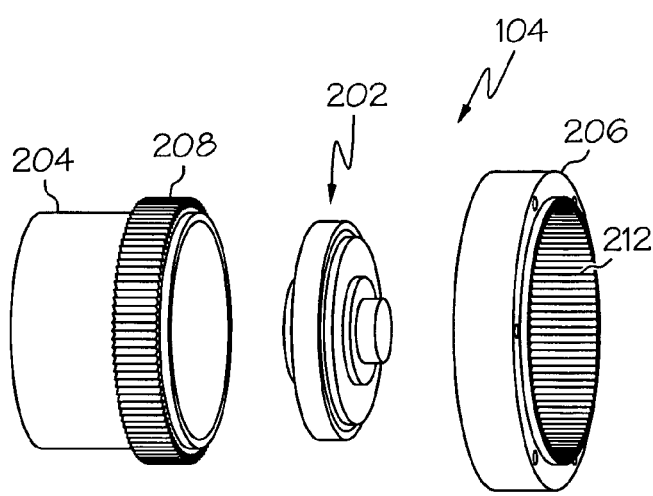
FIG. 2 is an exploded view of an exemplary harmonic drive that may be used to implement the actuator shown in FIG. 1.
Figure 3:
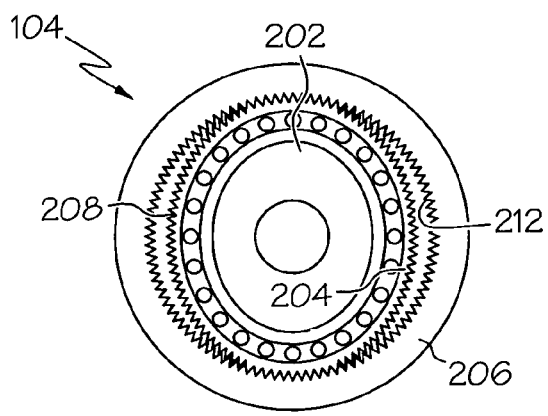
FIG. 3 is a cross section end view of the exemplary harmonic drive of FIG. 2.

With reference now to FIGS. 2 and 3, exploded and end views, respectively, of an exemplary embodiment of the interconnected internal components of the harmonic drive 104 are shown. The harmonic drive 104, which may be physically implemented in any one of numerous structural configurations now known or developed in the future, includes a wave generator 202, a flexspline 204, and a circular spline 206. The wave generator 202, which functions as the harmonic drive input member 116, has an outer surface that is generally elliptically shaped. The wave generator 202 is configured to couple to the motor shaft 114 and, when so coupled, rotates with the motor shaft 114.

The wave generator 202 is disposed within the flexspline 204, which in the depicted embodiment functions as the harmonic drive output member 118. The flexspline 204 is implemented as a relatively thin-walled cylinder, and includes a plurality of gear teeth 208 formed on the outer surface of a portion thereof. The flexspline 204 is configured such that it is radially compliant, yet torsionally stiff. Thus, as FIG. 2 shows, the when the wave generator 202 is disposed within the flexspline 204, the flexspline outer surface conforms to the same elliptical shape as the wave generator 202.

The circular spline 206 surrounds the flexspline 204, and in the depicted embodiment is mounted against rotation. A plurality of gear teeth 212 are formed into the inner surface of the circular spline 206, and mesh with the flexspline gear teeth 208 along the major axis of the ellipse. Because the flexspline 204 has less gear teeth 208 than the circular spline 206, a reduction in rotational speed between the input and output of the harmonic drive 104 is achieved. Although the difference in number of gear teeth may vary, in a typical configuration, there are two less flexspline gear teeth 208 than circular spline gear teeth 212.

Before returning to the description of the actuator assembly 100, it will be appreciated that the above-described harmonic drive 104 is merely exemplary of a particular embodiment, and that harmonic drives 104 of various other configurations and implementations could be used. Moreover, although the above-described harmonic drive 104 is configured such that the flexspline 204 functions as the output member, it will be appreciated that the harmonic drive 104 could also be configured such that the circular spline 206 functions as the output member.

Returning now to description of the actuator assembly 100, and with reference once again to FIG. 1, it is seen that the gear assembly 106 is coupled between the harmonic drive 104 and the motor assembly 102. In the depicted embodiment, one end of the gear assembly 106 is rotationally mounted on the motor housing 112, and the other end of the gear assembly 106 is coupled to the harmonic drive output member 118. Thus, the gear assembly 106 receives the torque supplied by the harmonic drive and, in response to the received torque, supplies a drive force to one or more components that may be coupled to the gear assembly 106. As FIG. 1 also shows, the gear assembly 106 is preferably configured to surround the motor shaft 114. This configuration simplifies the rotational mounting configuration of the gear assembly 106, and reduces the overall size envelope of the actuator assembly 100.

Figure 7:
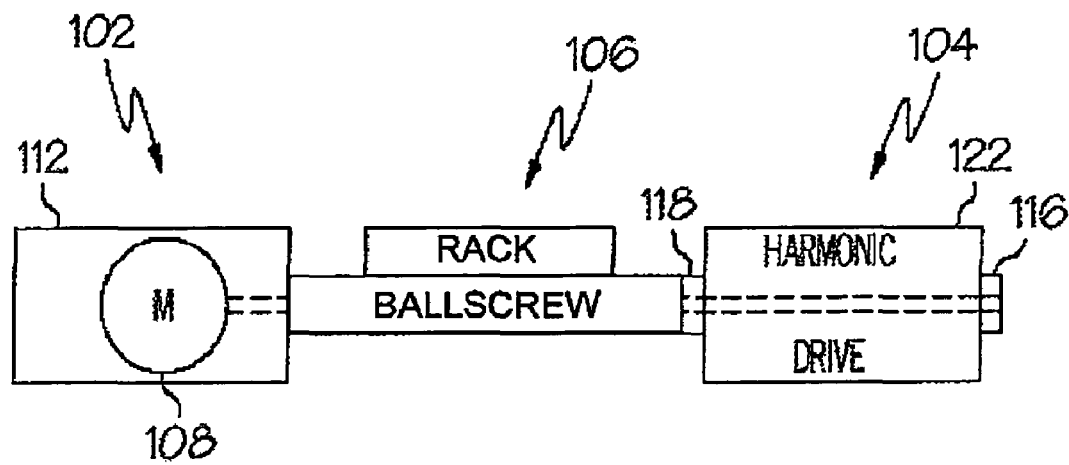
FIGS. 7 and 8 are functional block diagrams of the exemplary electromechanical actuator of FIG. 1, depicting particular exemplary gear set embodiments.
Figure 8:
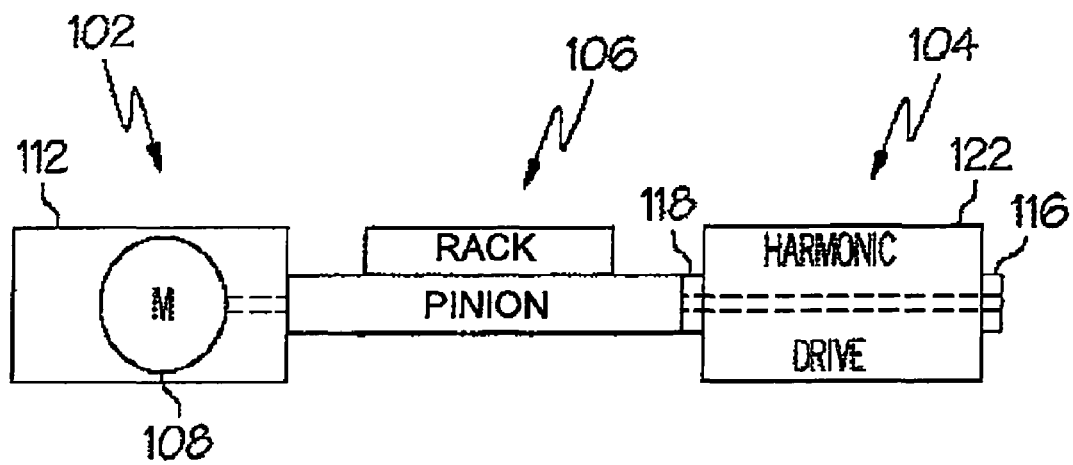

The gear assembly 106 may be implemented as any one of numerous types of gear configurations now known or developed in the future. For example, the gear assembly 106 may be implemented as a worm gear assembly, a rack and ball screw gear assembly (see FIG. 7) or a rack and pinion gear assembly (see FIG. 8). A particular physical implementation of the actuator assembly 100 in which the gear assembly 106 is implemented as a worm gear assembly is illustrated in FIGS. 4–6, and will now be described in more detail.

Figure 4:
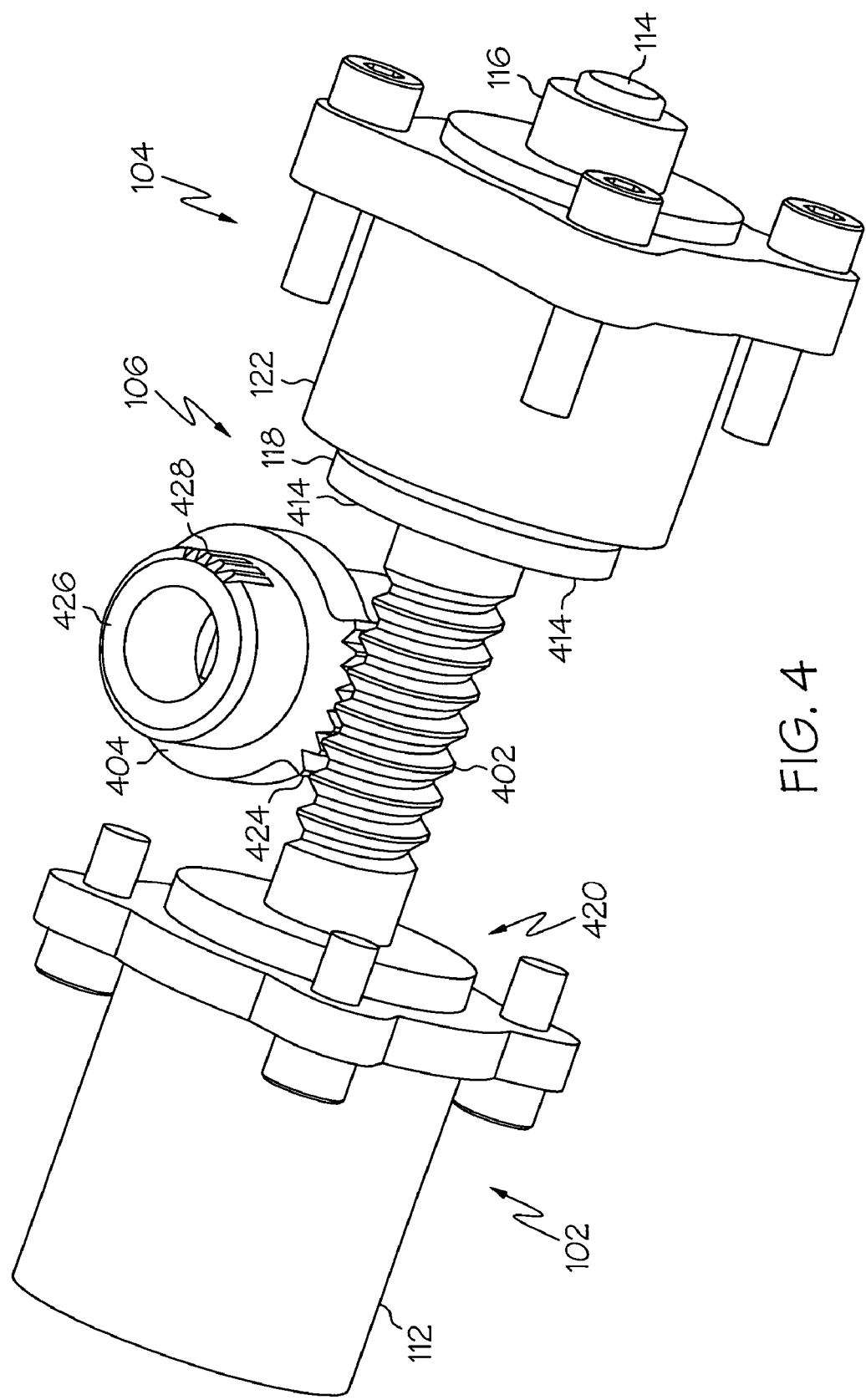
FIG. 4 is a perspective view of an exemplary physical implementation of the actuator assembly shown in FIG. 1.
Figure 5:
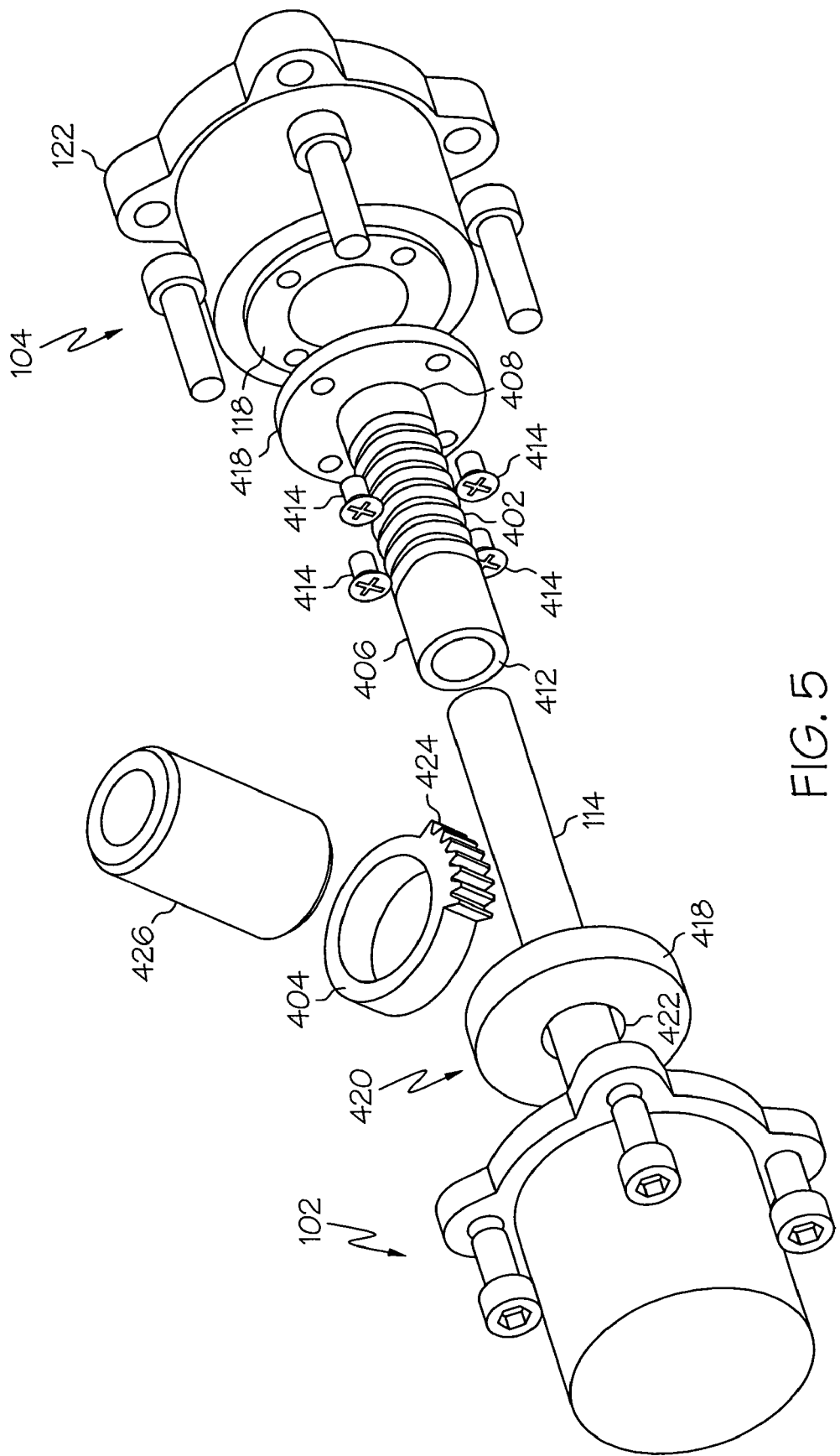
FIGS. 5 and 6 are perspective exploded views of the actuator assembly shown in FIG. 4.
Figure 6:
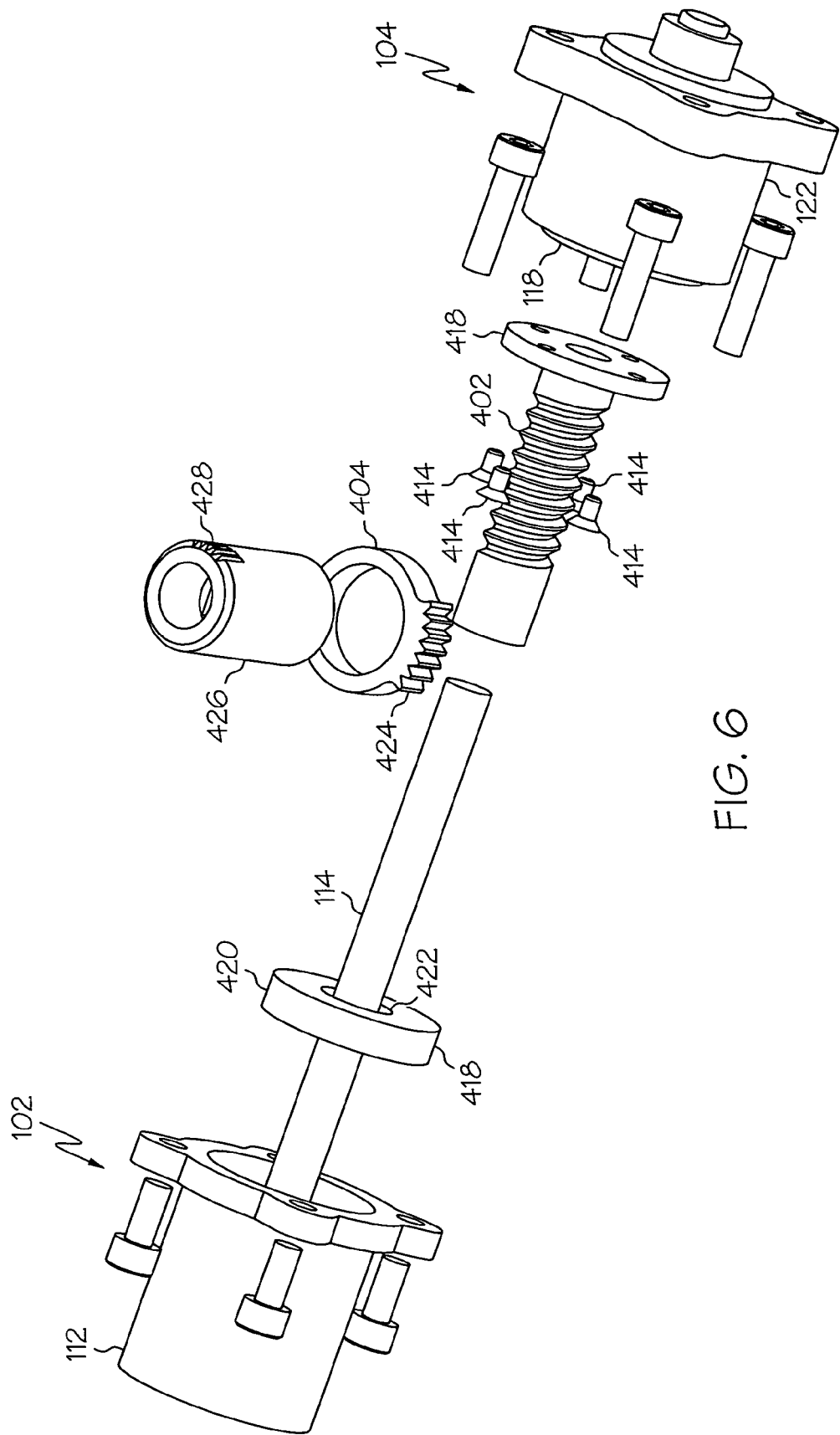

The actuator assembly 100 depicted in FIGS. 4–6 includes physical implementations of the various components described above, which for convenience are labeled using like reference numerals as in FIG. 1. Many of the above-described components are explicitly depicted and labeled in FIGS. 4–6. However, for clarity and ease of depiction, it will be appreciated that some of the above-described components are not illustrated. For example, FIGS. 4–6 depict physical implementations of the motor assembly 102, including both the motor housing 112 and the output shaft, the harmonic drive 104, including both the input member 116 and the output member 118, and the gear assembly 106. Conversely, the motor 108, which is housed within the motor housing 112, is not visible in FIGS. 4–6, nor are the internal components of the harmonic drive 104.

The motor assembly 102 and harmonic drive 104 both function, and are preferably configured, as previously described. Thus, detailed descriptions of the motor assembly 102 and harmonic drive 104 will not once again be provided. As previously described, the motor shaft 114 extends from the motor housing 112, into and through the harmonic drive 104, and is coupled to the harmonic drive input member 116. As FIGS. 4–6 show, the motor shaft 114 also extends through a portion of the gear assembly 106, which will now be described in more detail.

The gear assembly 106 shown in FIGS. 4–6 is, as was noted above, implemented as a worm gear assembly, and includes a worm 402 and a worm gear 404. The worm 402 is mounted on a substantially hollow gear shaft 406, which allows the motor shaft 114 to pass through it before entering the harmonic drive 104. The gear shaft 406 is coupled between the motor assembly 102 and the harmonic drive 104. In particular, the gear shaft 406 has a first end 408 (see FIG. 5) that is coupled to the harmonic drive output member 118, and a second end 412 (see FIG. 5) that is rotationally mounted on the motor housing 112. In the depicted embodiment, the gear shaft first end 408 is fixedly coupled to the harmonic drive output member 118 via a flange 414 and a plurality of fasteners 416, and the gear shaft second end 412 is rotationally mounted on the motor housing 112 via a bearing assembly 420.

The bearing assembly 420, which may be any one of numerous types of bearing assemblies now known or developed in the future, includes an outer race 418 that is fixedly coupled to the motor housing 112, and an inner race 422 that is free to rotate via, for example, a plurality of non-illustrated ball bearings. The gear shaft second end 412 is mounted within, or otherwise coupled to, the bearing assembly inner race 422. Thus, when the harmonic drive output member 118 rotates, the gear shaft 406 and worm 402 freely rotate.

The worm gear 404 includes a plurality of gear teeth 424 disposed on an outer periphery thereof. The worm gear teeth 424 operatively engage the worm 402. Thus, as is generally known, when the worm 402 rotates, the worm gear 404 concomitantly rotates. In the depicted embodiment, the worm gear teeth 424 are disposed on only a portion of the worm gear 404, which limits its rotational extent. It will be appreciated, however, that this is merely exemplary and that the worm gear 404 could be implemented to include gear teeth 424 around the entire periphery.

An output shaft 426 is coupled to the worm gear 404, and is rotated when the worm gear 404 rotates. In the depicted embodiment, the output shaft 426 includes a plurality of gear teeth 428 formed on an outer periphery thereof, which may be used to engage similarly configured gear teeth on a driven component. It will be appreciated that this is merely exemplary, and that the output shaft 426 could be implemented without gear teeth 428 depending, for example, on the specific component or components being driven by the actuator assembly 100.

When the actuator assembly 100 is assembled, the motor shaft 114 extends into and through the gear shaft 406, and into and through the harmonic drive 104, where it is coupled to the harmonic drive input member 116. Thus, when the motor 108 rotates and imparts a torque to the motor shaft 114, the torque is supplied to the harmonic drive 104, which in turn imparts a torque to the worm 402 via the gear shaft 406. As the worm 402 rotates, it in turn causes the worm gear 404 to rotate and supply a rotational drive force to the output shaft 426.

As was previously noted, the gear assembly 106 may be implemented using any one of numerous configurations, and not just the worm gear assembly shown in FIGS. 4–6. For example, the gear assembly 106 could instead be implemented as a rack and ball screw gear assembly, in which case the ball screw would preferably be hollow, or a rack and pinion gear assembly, in which case the pinion would be preferably hollow.

The actuator assembly 100 depicted and described herein includes a relatively small, low power electric motor 108 that is configured to run at a relatively high rotational speed, and a harmonic drive 104 that reduces the rotational speed and increases the output torque. The actuator assembly 100 additionally includes a gear assembly 106 that is disposed in-line between the harmonic drive 104 and the motor 108, and that is driven by the harmonic drive 104 at the reduced speed. This configuration provides an actuator assembly 100 that has a relatively small, compact size envelope. Moreover, because the gear assembly 106 is disposed in-line between the motor 108 and the harmonic drive 104, the rotational mounting of the gear assembly 106 is relatively simple.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An actuator assembly, comprising:
   a motor assembly including a motor and a motor shaft, the motor configured to supply a first torque to the motor shaft;
   a harmonic drive coupled to receive the first torque from the motor shaft and operable, in response thereto, to supply a second torque; and
   a gear assembly disposed axially between the motor assembly and the harmonic drive, the gear assembly rotationally coupled to the motor assembly and at least partially surrounding at least a portion of the motor shaft, the gear assembly further coupled to receive the second torque from the harmonic drive and operable, in response thereto, to supply a drive force.

2. The actuator assembly of claim 1, wherein the motor assembly further includes:
   a motor housing enclosing at least a portion of the motor,
   a bearing assembly mounted on the motor housing and rotationally coupled to the gear assembly.

3. The actuator assembly of claim 1, wherein the gear assembly comprises:
   a worm coupled to receive the second torque and configured, upon receipt thereof, to rotate; and
   a worm gear engaging the worm and configured to rotate therewith to thereby supply the drive force.

4. The actuator of claim 3, wherein the worm is mounted on a substantially hollow worm shaft that surrounds at least a portion of the motor shaft.

5. The actuator assembly of claim 1, wherein the gear assembly comprises:
   a pinion gear coupled to receive the second torque and configured, upon receipt thereof, to rotate; and
   a rack gear engaging the pinion gear and configured to translate in response to rotation thereof to thereby supply the drive force.

6. The actuator assembly of claim 5, wherein the gear assembly comprises:
   a hollow ball screw having a plurality of screw threads formed thereon, the ball screw coupled to receive the second torque and configured, upon receipt thereof, to rotate; and
   a rack gear engaging the screw threads and configured to translate in response to rotation thereof to thereby supply the drive force.

7. The actuator assembly of claim 1, wherein the drive force supplied from the gear assembly is a rotational drive force, and wherein the actuator assembly further comprises:
   an actuator output shaft coupled to receive the rotational drive force from the gear assembly and configured to rotate in response thereto.

8. The actuator of claim 7, further comprising:
   a plurality of gear teeth formed on an outer peripheral portion of the actuator output shaft.

9. The actuator assembly of claim 1, wherein the drive force supplied from the gear assembly is a translational drive force.

10. The actuator assembly of claim 1, wherein:
    the harmonic drive comprises a wave generator, a flexspline, and a circular spline; and
    the gear assembly is coupled to the flexspline.

11. An actuator assembly, comprising:

a motor housing;

a motor disposed within the housing and operable to rotate;

a motor shaft coupled to the motor and configured to rotate therewith;

a harmonic drive unit having an input member and an output member, the input member coupled to the motor shaft and configured to rotate therewith, the output member configured to rotate in response to rotation of the input member; and a gear assembly disposed axially between the motor housing and the harmonic drive, the gear assembly rotationally mounted on the motor housing and coupled to the harmonic drive output member.

12. The actuator assembly of claim 11, further comprising:

a bearing assembly mounted on the motor housing and coupled to the gear assembly to thereby rotationally mount the gear assembly on the motor housing.

13. The actuator assembly of claim 11, wherein the gear assembly comprises:

a worm coupled to the harmonic drive output member and configured to rotate therewith; and a worm gear engaging the worm and configured to rotate therewith to thereby supply a drive force.

14. The actuator of claim 13, wherein the worm is mounted on a substantially hollow worm shaft that surrounds at least a portion of the motor shaft.

15. The actuator assembly of claim 11, wherein the gear assembly comprises:

a pinion gear coupled to the harmonic drive output member and configured to rotate therewith; and a rack gear engaging the screw threads and configured to translate in response to rotation thereof to thereby supply the drive force.

16. The actuator assembly of claim 15, wherein the pinion gear comprises a hollow ball screw that surrounds at least a portion of the motor shaft.

17. The actuator assembly of claim 11, further comprising:

an actuator output shaft coupled the gear assembly.

18. The actuator of claim 17, further comprising:

a plurality of gear teeth formed on an outer peripheral portion of the actuator output shaft.

19. The actuator assembly of claim 11, wherein the gear assembly is configured to supply a translational chive force in response to rotation of the harmonic drive output member.

20. The actuator assembly of claim 11, wherein the harmonic drive comprises a circular spline, a wave generator coupled to the input member, and a flexspline coupled to the output member.

21. An actuator assembly, comprising:

a motor housing;

a motor mounted at least partially within the motor housing, the motor having a motor shaft and configured to supply a first torque thereto;

a harmonic drive coupled to receive the first torque from the motor shaft and operable, in response thereto, to supply a second torque;

an input gear disposed axially between the motor housing and the harmonic drive, and having at least a first end and a second end and at least partially surrounding at least a portion of the motor shaft, the input gear first end coupled to receive the second torque from the harmonic drive and operable, in response thereto, to rotate, the input gear second end rotationally mounted on the motor housing; and an output gear coupled to, and disposed radially outward of, the input gear and configured, upon rotation of the input gear, to supply a drive force.

* * * * *

UNITED STATES PATENT AND TRADEMARK OFFICE
CERTIFICATE OF CORRECTION

| | | |
|---|---|---|
| PATENT NO. | : 7,178,427 B2 | Page 1 of 1 |
| APPLICATION NO. | : 10/928690 | |
| DATED | : February 20, 2007 | |
| INVENTOR(S) | : Donald J. Christensen | |

It is certified that error appears in the above-identified patent and that said Letters Patent is hereby corrected as shown below:

Column 6, line 23, "motor," should be changed to --motor;--;
Column 8, line 9, "chive" should be changed to --drive--.

Signed and Sealed this

Fifth Day of June, 2007

JON W. DUDAS
*Director of the United States Patent and Trademark Office*